(12) United States Patent
Gray

(10) Patent No.: US 11,228,224 B2
(45) Date of Patent: Jan. 18, 2022

(54) AIR FLOW BAFFLE FOR ROTATING ELECTRICAL MACHINE

(71) Applicant: Cummins Generator Technologies Limited, Peterborough (GB)

(72) Inventor: Richard Gray, Lincolnshire (GB)

(73) Assignee: Cummins Generator Technologies Limited, Peterborough (GB)

(*) Notice: Subject to any disclaimer, the term of this patent is extended or adjusted under 35 U.S.C. 154(b) by 247 days.

(21) Appl. No.: 15/412,835

(22) Filed: Jan. 23, 2017

(65) Prior Publication Data

US 2017/0214288 A1    Jul. 27, 2017

(30) Foreign Application Priority Data

Jan. 25, 2016   (GB) .................................... 1601284

(51) Int. Cl.
*H02K 5/20* (2006.01)
*H02K 9/06* (2006.01)

(52) U.S. Cl.
CPC ............. *H02K 5/20* (2013.01); *H02K 9/06* (2013.01)

(58) Field of Classification Search
CPC ............... H02K 1/20; H02K 5/20; H02K 9/06
USPC ........... 310/52, 53, 55, 58, 59, 60 R, 62, 63, 310/60 A, 260
See application file for complete search history.

(56) References Cited

U.S. PATENT DOCUMENTS

| | | | | |
|---|---|---|---|---|
| 1,852,476 A | * | 4/1932 | Pfleger ................. | H02K 9/06 310/57 |
| 3,027,470 A | * | 3/1962 | Atherton ............... | H02K 9/06 310/57 |
| 3,293,461 A | * | 12/1966 | Uemura ................ | H02K 9/14 310/57 |
| 3,761,748 A | | 9/1973 | Baumann et al. | |
| 4,031,422 A | * | 6/1977 | Armor ................... | H02K 1/20 310/256 |
| 4,689,507 A | * | 8/1987 | Baker ................... | H02K 9/06 310/414 |

(Continued)

FOREIGN PATENT DOCUMENTS

| CN | 203896114 U | 10/2014 | |
|---|---|---|---|
| EP | 416468 A1 | * 3/1991 | |

(Continued)

OTHER PUBLICATIONS

Fukuoka, Machine Translation of JP02097251, Apr. 1990 (Year: 1990).*

(Continued)

*Primary Examiner* — Quyen P Leung
*Assistant Examiner* — Eric Johnson
(74) *Attorney, Agent, or Firm* — Foley & Lardner LLP

(57) ABSTRACT

A baffle 30 is disclosed for directing cooling air in a rotating electrical machine comprising a stator core and end windings. The baffle comprises a first surface 33 arranged to direct air flow along an end face of the stator core 16, and a second surface 35 arranged to direct air flow along a radially outwards surface of the end windings 18. This may help to reduce turbulence in the airflow, thereby allowing more efficient transfer of heat. Furthermore, greater priority may be given to air flow through the rotor/stator air gap 14, and thus increasing air flow through the centre of the machine.

20 Claims, 6 Drawing Sheets

(56) References Cited

U.S. PATENT DOCUMENTS

| | | | | |
|---|---|---|---|---|
| 5,214,324 A | * | 5/1993 | Holmes | H02K 3/24 |
| | | | | 310/260 |
| 7,348,697 B2 | * | 3/2008 | Kreitzer | H02K 5/20 |
| | | | | 310/52 |
| 2003/0090163 A1 | | 5/2003 | Bostwick et al. | |
| 2011/0304230 A1 | * | 12/2011 | Schreiber | F04D 29/441 |
| | | | | 310/63 |

FOREIGN PATENT DOCUMENTS

| | | | | | |
|---|---|---|---|---|---|
| JP | | 02097251 A | * | 4/1990 | |
| JP | | 03027749 A | * | 2/1991 | |
| JP | | 06-327186 | | 11/1994 | |
| WO | WO 2005/050819 A2 | | | 6/2005 | |
| WO | WO-2005050819 A2 | * | | 6/2005 | F04D 29/162 |

OTHER PUBLICATIONS

Matsuoka, Machine Translation of JP03027749, Feb. 1991 (Year: 1991).*

Search Report Issued for United Kingdom Patent Application No. GB1601284.1, dated Jul. 12, 2016, 5 pages.

\* cited by examiner

AIR FLOW BAFFLE FOR ROTATING ELECTRICAL MACHINE

CROSS-REFERENCE TO RELATED APPLICATIONS

This application claims priority to United Kingdom Patent Application No. 1601284.1, filed on Jan. 25, 2016, the contents of which are incorporated herein by reference in their entirety and for all purposes.

BACKGROUND OF THE INVENTION

The present invention relates to an air flow baffle for use with a rotating electrical machine, and in particular an air flow baffle to assist with cooling of the machine.

Rotating electrical machines, such as motors and generators, generally comprise a rotor mounted on a shaft and arranged to rotate inside a stator. The rotor comprises a rotor core which holds rotor windings or permanent magnets. The rotor windings or permanent magnets produce a rotating magnetic field which crosses an air gap between the rotor and the stator. The stator comprises a stator core which holds stator windings which combine with the rotating magnetic field. The stator itself may be held within a stator frame.

When the machine is in operation, currents passing through the stator and/or rotor windings, as well as other factors such as friction and windage losses, may cause the machine to heat up. Therefore many machines, particularly those of a larger design, require some form of cooling. This may be achieved by providing a fan for forcing air flow through the machine. The fan may be mounted on the rotor shaft, or an independently-driven remote fan may be provided. The fan may either push or pull air through the machine.

Air flow through the machine is usually in a generally axial direction. The main paths for the air flow are through the rotor/stator airgap, and through an airgap between the stator core and the stator frame. This can help to ensure that both sides of the stator core are cooled.

In a typical machine the air gap between the stator core and the stator frame is greater than the air gap between the rotor and the stator. This may lead to a greater proportion of the air flow passing around the outside of the stator core rather than through the centre of the machine. However for optimum cooling it may be desirable to increase the proportion of air flow through the rotor/stator air gap.

In known rotating electrical machines, as air flow exits the air gap between the stator core and the stator frame, it encounters a void. This void is caused by the presence of end windings which extend out of the stator core, and which require the stator frame to be longer than the stator core. The presence of a void causes eddy currents to be introduced into the airflow. This leads to pressure loss, reducing the air flow velocity, and resulting in a reduction in the transfer of heat to the cooling air. Furthermore, the fan itself may introduce turbulence into the air flow, also leading to a reduction in the transfer of heat.

It is known to provide an air flow baffle within a rotating electrical machine in order to help direct airflow from the stator towards the fan. The baffle is typically disc-shaped, and is located axially outwards of the end windings. The baffle presents a flat annular surface to the end windings, which helps to turn air flow from an axial direction to a radial direction around the extremity of the end windings. However such baffles may still allow eddy currents and/or turbulence to be introduced into the air flow, and may not provide optimum cooling of the end windings. Furthermore, known baffles do not address the problem of insufficient air flow through the rotor/stator air gap.

BRIEF SUMMARY OF THE INVENTION

According to a first aspect of the present invention there is provided a baffle for directing cooling air in a rotating electrical machine comprising a stator core and end windings, the baffle comprising:
  a first surface arranged to direct air flow along an end face of the stator core; and
  a second surface arranged to direct air flow along a radially outwards surface of the end windings.

The present invention may provide the advantage that, by providing a baffle with a first surface arranged to direct air flow along an end face of the stator core, and a second surface arranged to direct air flow along a radially outwards surface of the end windings, it may be possible to create an air channel in which the air flow is smoother and/or of higher velocity than would otherwise be the case. This may help to ensure more efficient transfer of heat to the cooling air, thus providing more effective cooling. Furthermore, the baffle may increase the air resistance for air passing through the stator/frame air gap, thereby giving greater priority to the rotor/stator air gap, and thus increasing the air flow through the centre of the machine. This may increase the overall effectiveness of the cooling.

Preferably the first surface is a substantially flat annular surface, and the second surface is a substantially cylindrical or frustoconical shaped surface extending from a radially inwards edge of the first surface. This may help to ensure a suitable air flow path around the stator core and end windings.

By "substantially flat" it is preferably meant that the surface extends mainly in one direction, although a certain element of curvature may be present. Similarly, by "substantially cylindrical or frustoconical shaped" it is preferably meant that the surface has a shape which is generally cylindrical or frustoconical, although a certain element of curvature may also be present. In general, the exact shape of the surfaces will be chosen to achieve suitable air flow paths in line with the principles described herein.

Preferably the first surface extends in a substantially radial direction and/or the second surface extends in a substantially axial direction. This may help to provide a directed air path around internal parts of an electrical machine, such as a stator core and end windings. By "substantially radial" it is preferably meant that a main component of the air flow is in a radial direction, although axial and/or circumferential components may also be present. Similarly, by "substantially axial" it is preferably meant that a main component of the air flow is in an axial direction, although radial and/or circumferential components may also be present.

The first surface may be a surface of a disc-shaped section of the baffle. Preferably the disc-shaped section has a radially inwards circumferential edge which defines a centre hole. The first surface is preferably outwards facing, and is preferably arranged to face the end of the stator core.

The second surface may be a surface of a cylindrical or frustoconical shaped section of the baffle. The second surface is preferably an inner surface, and preferably extends rearwards of the first surface. The second surface may be arranged to face a radially outwards surface of an end winding.

The baffle may be formed from a plurality of thin-walled sections, which may make the baffle easy to manufacture and light weight. However baffle may be formed in other ways such as from a solid piece providing the first and second surfaces.

The baffle may further comprise a third surface extending from an end of the second surface, the third surface curving from a substantially axial direction to a substantially radial direction (when viewed in radial cross section). The third surface may be arranged to direct air flow around an extremity of the end windings. The third surface may be an inner surface of a curved annular section of the baffle, and may extend circumferentially around an extremity of an end winding. This may further help to direct air flow in a smooth manner around the inside of the machine, thereby helping with cooling.

The baffle may further comprise a curved lip extending from an end of the third surface. The curved lip is preferably annular. The curved lip may be provided to help with the smooth flow or air to or from a cooling fan.

The baffle may further comprise a peripheral member for securing the baffle to the machine. The peripheral member may be annular, and may run around the outside of the baffle. Preferably the peripheral member extends in a substantially radial direction. The peripheral member may be arranged to be clamped between two parts of the machine, such as an adaptor and a stator frame. This may provide a simple and effective way of securing the baffle to the machine.

The baffle may further comprise a rim for engaging with an inner surface of a stator frame. The rim is preferably provided on a radially outwards edge of the first surface. The rim may be arranged to engage with the inner surface of the stator frame with an interference fit. This may help with stability and/or help to provide a seal against the stator frame. However, alternatively, a gap may be left between the rim and the stator frame.

The rim may include castellations, which may be arranged to fit around landing bars in the stator core. This may help to seal the baffle against the stator frame, and may help to prevent the baffle from rotating.

In the arrangement described above, the peripheral member may act as a securing means for securing the baffle to the machine. In addition, the rim and/or the lip may help to secure the baffle to the machine. Thus the baffle may comprise at least two axially separated securing means, each of which may help to secure the baffle to the machine. For example, two or more of a peripheral member, a rim and a lip may function as a securing means. By providing at least two axially separated securing means, it may be possible for the baffle to extend further in an axial direction than would otherwise be the case, and stability of the baffle may be improved.

Preferably the baffle is arranged to direct air flow in a rotating electrical machine comprising a stator frame and a stator core with an air gap between the two, and end windings extending out of the stator core. In this case, the baffle may be arranged to direct air flow entering or exiting the air gap. Preferably the air flow is directed around the end windings. By directing the air flow around the end windings, they may be cooled more effectively, which may help with overall cooling of the machine.

The first surface may be arranged to face the stator core. For example, the first surface may face an end of the stator core in an axial direction. This can allow the baffle to re-direct air flowing into or out of the air gap between the stator frame and the stator core.

Preferably the first surface is arranged to direct air flow along an end face of the stator core. Thus the first surface may be arranged to direct air flow in a substantially radial direction and/or in a direction substantially parallel to the end face of the stator core. For example, the first surface may be arranged to direct air flow between the air gap and a region of the end windings where the end windings exit the stator core. By directing air flow to or from a region of the end windings where they exit the stator core, air may flow along a greater part of the end windings than would otherwise be the case, thereby improving their cooling.

The second surface may be arranged to face the end windings. For example, the second surface may be arranged to face an outer surface of the end windings, in a radial direction. This may allow the second surface to direct air flow along at least part of the end windings, and preferably along substantially the whole length of the end windings. This may allow heat to be drawn more effectively out of the end windings, thereby improving the cooling of the machine.

Preferably the second surface is arranged to direct air flow along a radially outwards surface of the end windings. Thus the second surface may be arranged to direct air flow in a direction substantially parallel to a radially outwards surface of the end windings. For example, the second surface may be arranged to direct air flow between a region of the end windings where the end windings exit the stator frame and an axial extremity of the end windings. This may allow the second surface to direct air flow along substantially the whole length of the end windings, thereby improving their cooling.

Preferably the baffle conforms at least in part to the shape of the end windings, which may help to maximise air flow around the windings.

Where a third surface is provided, the third surface may be arranged to re-direct air flow from a substantially axial direction to a substantially radial direction or vice versa. For example, the third surface may be arranged to direct air flow around an extremity of the end windings. This may help to improve cooling, by increasing the surface area of the end windings over which the air flows.

Where a curved lip is provided, the curved lip may be arranged to return air flow to a substantially axial direction. This may help to direct air flow smoothly towards a fan, and may help with mixing of the air flow with air flow from a rotor/stator air gap.

Where a peripheral member is provided, the peripheral member may be arranged to be clamped between the stator frame and a component which is attached to the stator frame, such as an adaptor or an end housing. For example, the peripheral member may be arranged to be clamped between the stator frame and a drive end adaptor for connecting the machine to a prime mover. This may allow the baffle to be secured without the need to provide separate fixing components.

Preferably the baffle provides a seal against the stator core. This may help to ensure that all of the air flow into or out of the air gap passes around at least part of the end windings, thereby helping with cooling.

Preferably the baffle provides a full seal for air flow between the stator/frame air gap and an entry point to a fan. Thus the baffle may direct all of the air flow into or out of the stator/frame air gap around the end windings and to or from the fan. By providing a full seal between the stator/ frame air gap and an entry point to the fan, any void at the exit of the air gap is sealed off, thereby reducing or eliminating eddy currents in the air flow. This in turn may help to improve the cooling efficiency (i.e. the amount of cooling that can be achieved for a give fan power).

Where the baffle comprises a rim, the rim may include castellations which fit between landing bars in the stator core. This may help to ensure that the baffle is sealed against the stator core, and may also help to ensure that the baffle cannot rotate.

Preferably an air channel between the baffle and the stator core and/or the end windings is substantially constant in depth, which may help to ensure smooth air flow.

Preferably the baffle increases an air resistance of air flow to or from the stator/frame air gap. Increasing the air resistance of air flow to or from the air gap between the stator core and the stator frame may give greater priority to air flow through an air gap between the rotor and the stator. Thus the baffle may be arranged to increase an amount of air flow through a rotor/stator air gap, in comparison to the case where the baffle is not present. This may help to re-balance air flow between the two air gaps, which may help to improve overall cooling efficiency.

In a preferred embodiment the baffle is moulded. This may provide an easy and inexpensive way of manufacturing the baffle. In order to assist with moulding, the baffle may be formed from two or more parts. For example, the baffle may be formed from two semi-annular components which fit together. As well as allowing the baffle to be more readily moulded, this can allow the baffle to be fitted around the shaft of the machine, thereby facilitating assembly.

Preferably the baffle is formed from two or more parts which are arranged to clip together. This may further facilitate assembly and avoid the need for separate connecting parts.

A suitable material for the baffle is a heat resistant plastic, although other materials, such as metal, could be used instead. Furthermore, rather than moulding, other manufacturing techniques such as machining could be used if desired.

According to another aspect of the present invention there is provided a rotating electrical machine comprising a stator core and end windings, and a baffle in any of the forms described above. The machine may be for example a motor or a generator. The baffle may be provided at either or both ends of the machine.

The machine may further comprise means for causing air flow through the machine. For example, one or more fans may be provided which may either push or pull air flow through the machine, or both.

According to another aspect of the present invention there is provided a baffle for directing cooling air in a rotating electrical machine, the machine comprising a stator frame and a stator core with an air gap between the two, and end windings extending out of the stator core, the baffle comprising a first surface arranged to direct air flow along an end face of the stator core, and a second surface arranged to direct air flow along a radially outwards surface of the end windings. The baffle may direct air flow to or from the air gap.

The baffle may further comprise a third surface arranged to direct air flow around an extremity of the end windings.

According to another aspect of the present invention there is provided a baffle for directing cooling air in a rotating electrical machine, the baffle comprising:
a substantially flat annular first surface; and
a substantially cylindrical or frustoconical shaped second surface extending
from a radially inwards edge of the first surface.

According to another aspect of the invention there is provided a method of cooling a rotating electrical machine, the machine comprising a stator core and end windings extending out of the stator core, the method comprising directing air flow along an end face of the stator core, and directing air flow along a radially outwards surface of the end windings. The machine may comprise a stator frame and a stator core with an air gap between the two, and the air flow may be to or from the air gap.

Features of one aspect of the invention may be provided with any other aspect. Apparatus features may be provided with method aspects and vice versa.

As used herein, terms such as "axially", "radially" and "circumferentially" are preferably defined with reference to a longitudinal axis of the baffle and/or an axis of rotation of the electrical machine.

BRIEF DESCRIPTION OF THE DRAWINGS

Preferred features of the present invention will now be described, purely by way of example, with reference to the accompanying drawings, in which:

Referring to FIG. 1, the machine comprises a rotor 10 located inside a stator 12 with an air gap 14 between the two. The rotor is mounted on a shaft 15. The stator 12 comprises a stator core 16 with slots on its inner circumference in which are wound stator windings. End windings 18 extend out of the stator slots and around the outside of the stator core.

Figure 1:
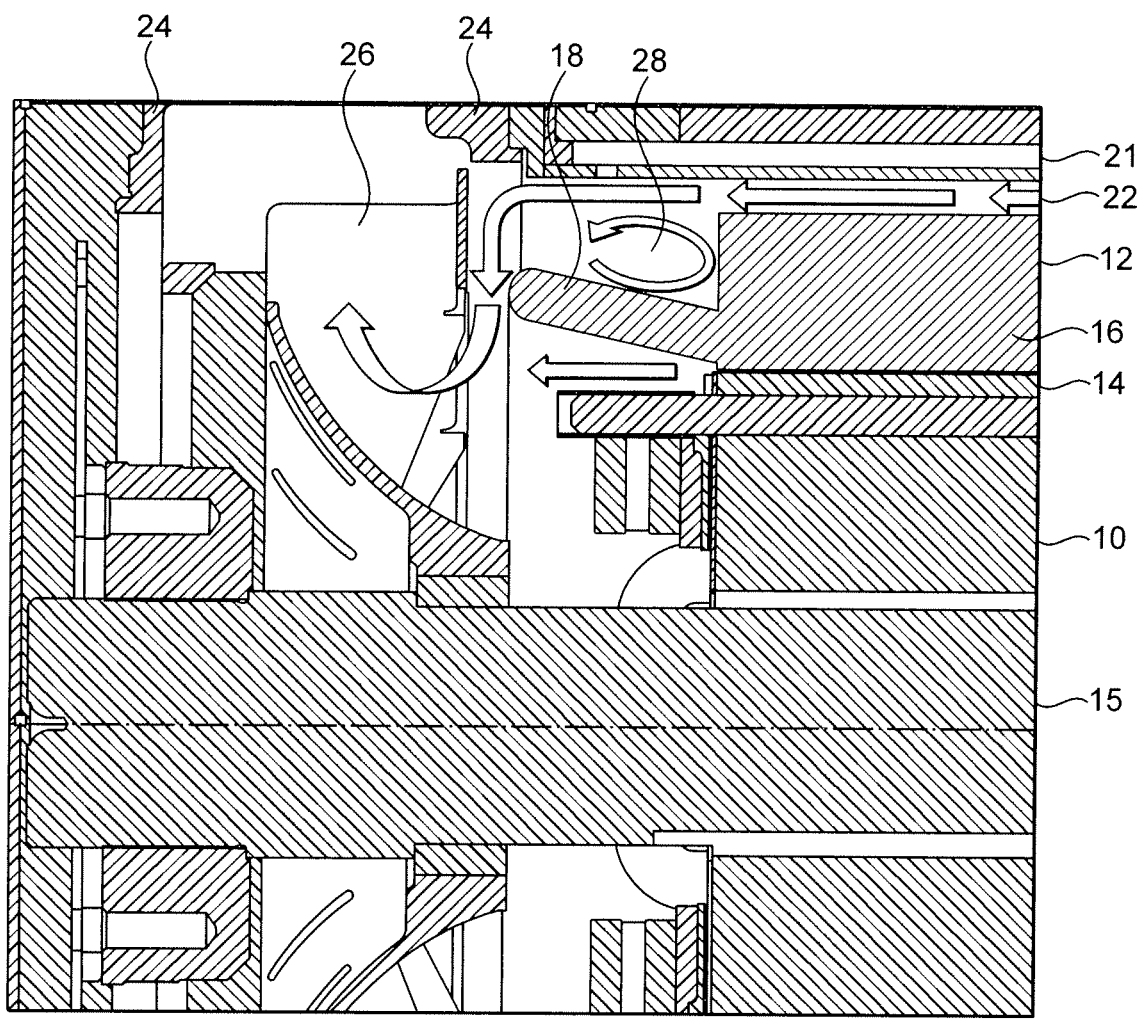
FIG. 1 is a cross section through part of a previously known rotating electrical machine.

The stator 12 is contained within a substantially cylindrical stator frame (not shown in FIG. 1). Landing bars 21 engage with the stator core 16 on its outer circumference, and are attached to the stator frame in order to locate the stator core within the stator frame. The landing bars protrude radially outwards from the stator core, and thus create air gaps 22 between the stator core 16 and the stator frame.

In this example the electrical machine is a synchronous generator which is driven by a prime mover such as a diesel engine. A drive end adaptor 24 is located at the end of the electrical machine, and is used to connect the machine to the prime mover. The drive end adaptor 24 is bolted to the stator frame. A fan 26 is mounted on the shaft 15 inside the drive end adaptor 24.

In operation, the fan 26 draws air flow through the machine in order to provide cooling. This air flow is predominately in an axial direction through the rotor/stator air gap 14 and the stator/frame air gap 22, as indicated by the arrows in FIG. 1. Alternatively, the fan may push air through the machine, in which case air flow would be in the opposite direction. If desired, an external, independently-driven fan or fans could be used instead of a shaft driven fan.

Still referring to FIG. 1, it can be seen that a void 28 is present at the exit of the air flow from the stator/frame air gap 22. This void is caused by the presence of end windings 18, which requires the stator frame to be longer than the stator core 16. The increase in cross sectional area as the airflow exits the stator face causes a reduction in pressure and velocity on the outer side of the stator end windings, which in turn reduces the cooling effect of the airflow. Furthermore, as the airflow enters the void 28, it rotates, leading to eddy currents. In addition, the proximity of the fan 26 may add turbulence to the air flow. The presence of eddy currents and turbulence leads to pressure loss, reducing the air flow velocity, and resulting in a reduction in the transfer of heat to the cooling air.

In a rotating electrical machine it is normally desirable to keep the rotor/stator air gap as small as possible, in order to minimise the air gap reluctance. As a consequence, the stator/frame air gap 22 is usually larger than the rotor/stator air gap 14. This may lead to a greater proportion of air flow through the stator/frame air gap 22 than through the rotor/stator air gap 14. For example, in some machines the proportion of air flow has been found to be 70% through the stator/frame air gap and 30% through the through the rotor/stator air gap. However the inside of the machine is typically subject to the largest temperature rises, in particular around the stator windings, and rotor windings if a wound rotor is used. Therefore it would be desirable to increase the proportion of air flow through the rotor/stator air gap 14.

In a preferred embodiment of the present invention, a novel air flow redirection baffle is provided which helps to address at least some of the above issues.

Figure 2:
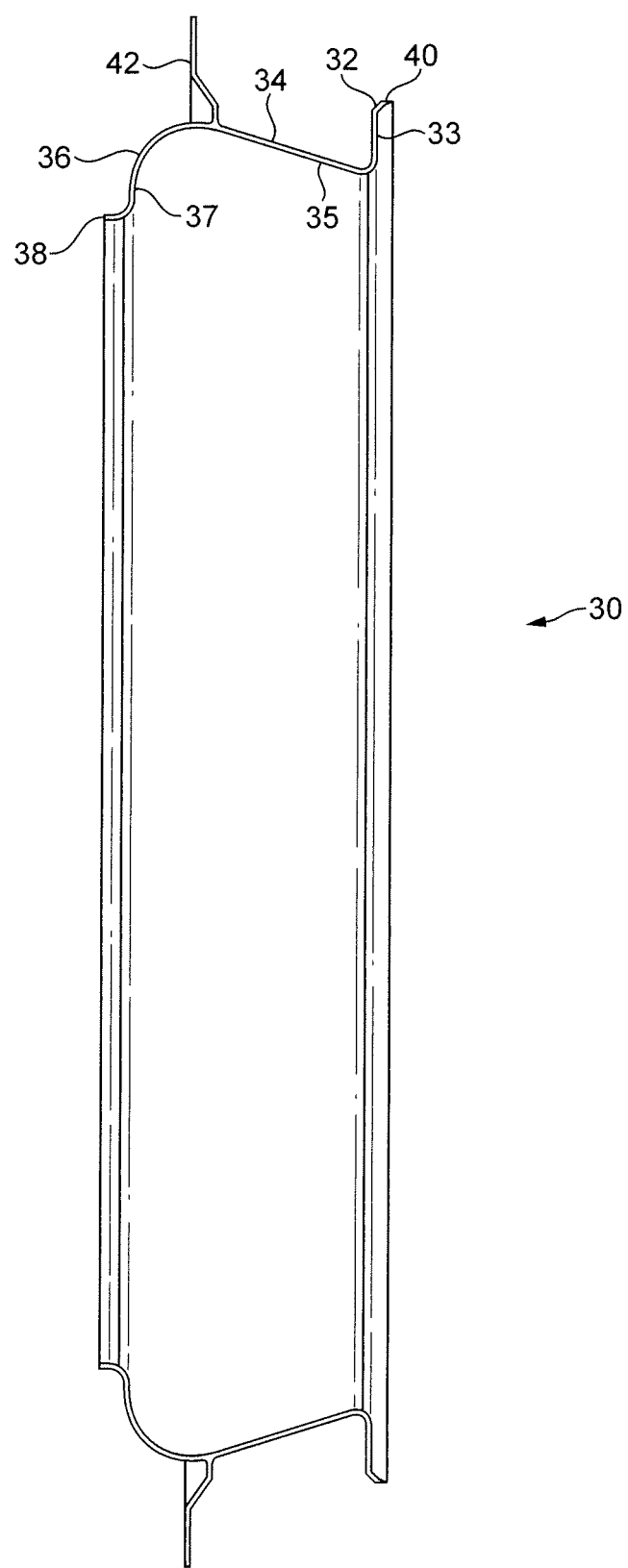
FIG. 2 is a cross section through a baffle in accordance with an embodiment of the invention.

FIG. 2 is a cross section through a baffle for directing air flow within a rotating electrical machine in accordance with an embodiment of the invention. The baffle is substantially annular, and is designed to fit within the frame of a rotating electrical machine.

Referring to FIG. 2, the baffle 30 includes a first section 32, a second section 34, and a third section 36. The first section 32 extends in a substantially radial direction, and has a substantially flat annular surface 33. The second section 34 extends from a radially inwards edge of the first section 32 in an outwardly axial direction (i.e. a direction which is mainly axial but also includes a radially outwards component). The second section 34 has a frustoconical shaped inner surface 35.

The third section 36 extends from an end of the second section, and has an inner surface 37 which curves around from an outwardly axial direction towards a substantially radial direction. A lip 38 is provided at the end of the third section 36. The lip 38 curves around from a substantially radial direction to a substantially axial direction.

A rim 40 is provided on the perimeter of the first section 32. The rim 40 is designed to engage with, or be in proximity to, the inside of the stator. Although not shown in FIG. 2, the rim 40 includes cut-outs or castellations, which allow the first section 32 to engage on an inner part of the landing bars in the stator.

The baffle of FIG. 2 also includes a peripheral member 42. The peripheral member 42 is located on the outside of the baffle in the region where the second section 34 meets the third section 36. The peripheral member 42 is annular, and extends in a radially outwards direction. The peripheral member 42 is designed to be clamped between the drive end adaptor and the stator frame in the rotating electrical machine. Crush features are provided on the face of the peripheral member 42 in a plurality of positions to allow for the machining tolerance variation of the adaptor and frame.

Figure 3:
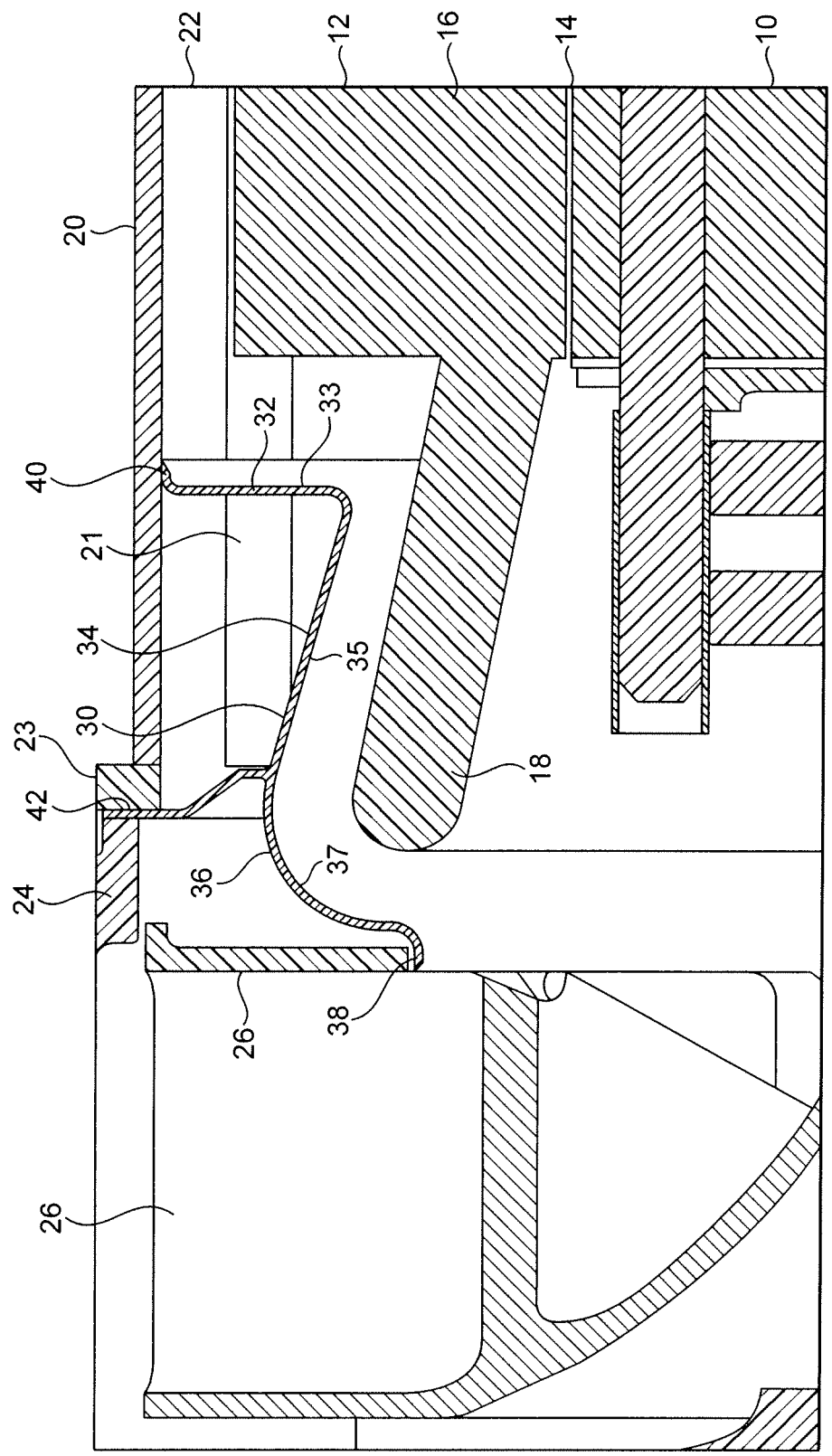
FIG. 3 is a cross section through part of a rotating electrical machine including the baffle of FIG. 2.

FIG. 3 is a cross section through part of a rotating electrical machine including the baffle of FIG. 2. Referring to FIG. 3, the machine comprises a rotor 10 located inside a stator 12 with an air gap 14 between the two. The stator 12 comprises a stator core 16 with slots on its inner circumference in which are wound stator windings. End windings 18 extend out of the stator slots and around the outside of the stator core. The stator 12 is contained within a substantially cylindrical stator frame 20. Landing bars 21 engage with the stator core 16 on its outer circumference, and are attached to the stator frame 20 in order to locate the stator core within the stator frame. The landing bars extend radially outwards from the stator core, and thus create air gaps 22 between the stator core 16 and the stator frame 20. A drive end adaptor 24 is located at the end of the electrical machine, and is used to connect the machine to the prime mover. The drive end adaptor 24 is bolted to a ring 23 of the stator frame 20. A fan 26 is mounted inside the drive end adaptor 24.

In the arrangement shown in FIG. 3, the baffle 30 is inserted in the drive end of the machine and extends in a circumferential direction around the inside of the stator frame 20. The rim 40 engages with the inside surface of the stator frame 20 with an interference fit. The peripheral member 42 of the baffle is clamped between the drive end adaptor 24 and the ring 23 of the stator frame 20. Thus the baffle 30 is secured to the machine at two different locations which are spaced apart axially. This can allow the baffle to take a shape which is more elongated in the axial direction than with prior baffles, and helps to ensure mechanical stability.

Still referring to FIG. 3, it can be seen that the surface 33 of the first section 32 faces the end of the stator core 16. The surface 35 of the second section 34 faces the radially outwards surface of the end windings 18. The surface 37 of the third second 36 curves around the end of the ending windings 18. In addition, the lip 38 curves around the inside of the fan 26.

In operation, the first section 32 turns the axial air flow from the stator/frame air gap 22 in a radially inward direction so cooling the end windings 18 as they exit the stator core 16. The baffle profile then follows the angle of the end windings 18 at an optimum distance to ensure that the end windings are cooled by passing the entire stator/frame air gap air flow over the windings at an optimum distance, resulting in an increase in airflow velocity in close proximity to the outer surface of the end windings so improving cooling.

At an optimal point past the axial extent of the end windings, the baffle returns to directing the air inwards in the radial direction. The baffle terminates in a static inducer lip 38 that enables a smooth reduced turbulence input to the main cooling fan 26.

Figure 4:
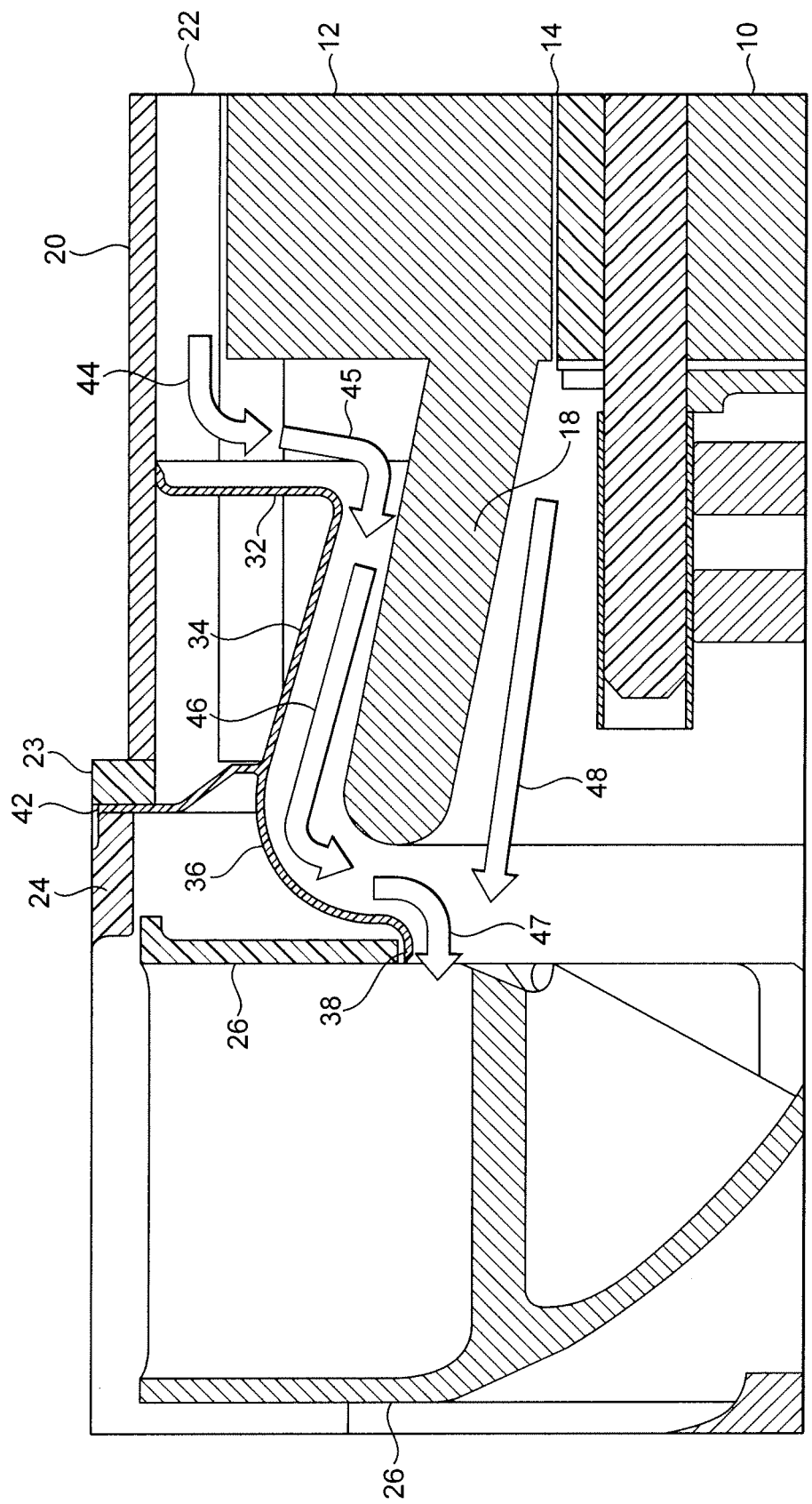
FIG. 4 illustrates air flows within the machine of FIG. 3.

FIG. 4 illustrates air flows within the machine of FIG. 3 when the machine is in operation. Referring to FIG. 4, air exits the air gap 22 between the stator core and stator frame, and is deflected radially inwards by the first section 32 of the baffle 30, as indicated by arrow 44. The air then flows radially inwards, along an end face of the stator core, towards the region where the end windings 18 exit the stator core. As it reaches the end windings, the air flow is turned back to the axial direction as indicated by arrow 45. The air then flows along a path parallel to the outer surface of the end windings 18, as indicated by the body of arrow 46. The third section 38 of the baffle then turns the air flow around the extremity of the end windings, as indicated by the end of arrow 46. The air flows around the end of the end windings 18 and then around the curved static inducer lip 38, and into the fan 26, as indicated by arrow 47. Air also exits the rotor/stator air gap 14 and flows towards the fan 26, as indicated by arrow 48.

The baffle 30 of the present embodiment creates a controlled air path from the stator/frame air gap 22, around the outside of the stator core and around the end windings 18 through to the fan 26. Thus the baffle eliminates the void which would otherwise be present above the end windings 18. This helps prevent the formation of eddy currents which may otherwise be generated in the void. Furthermore, the baffle 30 shields the air flow around the end windings from the turbulence generated by fan 26. Thus a smoother, non-turbulent path is created around the stator and the end windings. The curved static inducer lip 38 provides a smooth air flow path into the fan, and improves the blending of the two air flows into the rotating cooling fan (i.e. the air flows from the stator/frame air gap 22 and the rotor/stator air gap 14).

By creating a smoother, higher velocity, non-turbulent airflow, and improved blending of the two airflow streams, a more efficient air flow is achieved which results in a better transfer of heat to the cooling air, and thus improved cooling of the machine. Furthermore, by drawing air flow along substantially the whole length of the end windings 18, better cooling of the end windings is achieved, which helps to draw heat out from the centre of the machine.

The baffle 30 of the present embodiment also provides the advantage that the circuit air resistance out of the stator/frame air gap 22 can be controlled, by controlling the size of the channel created by the baffle. This can allow the air resistance encountered by air flow through the stator/frame air gap 22 to be increased, so that air flow is more in favour of the rotor/stator air gap 14 than would otherwise be the case. This can help to re-balance the proportion of air flow through the rotor/stator air gap 14, thus improving the overall cooling performance.

A further advantage of the baffle 30 of the present embodiment is that it can completely seal the air flow path between the stator/frame air gap 22 and the fan 26. This is achieved by ensuring that the rim 40 seals against the inside surface of the stator frame 20. By sealing the air flow path, the air is forced to flow along the length and around the nose of the end windings 18, thus allowing better cooling to be achieved.

In an alternative embodiment, a small air gap may be left between the baffle and the stator frame. In this case, a seal between the frame and the baffle is provided by the peripheral member 42. This seal ensures that there is no air path between the air gap 22 and the fan 26 other than around the end windings 18.

Figure 5:
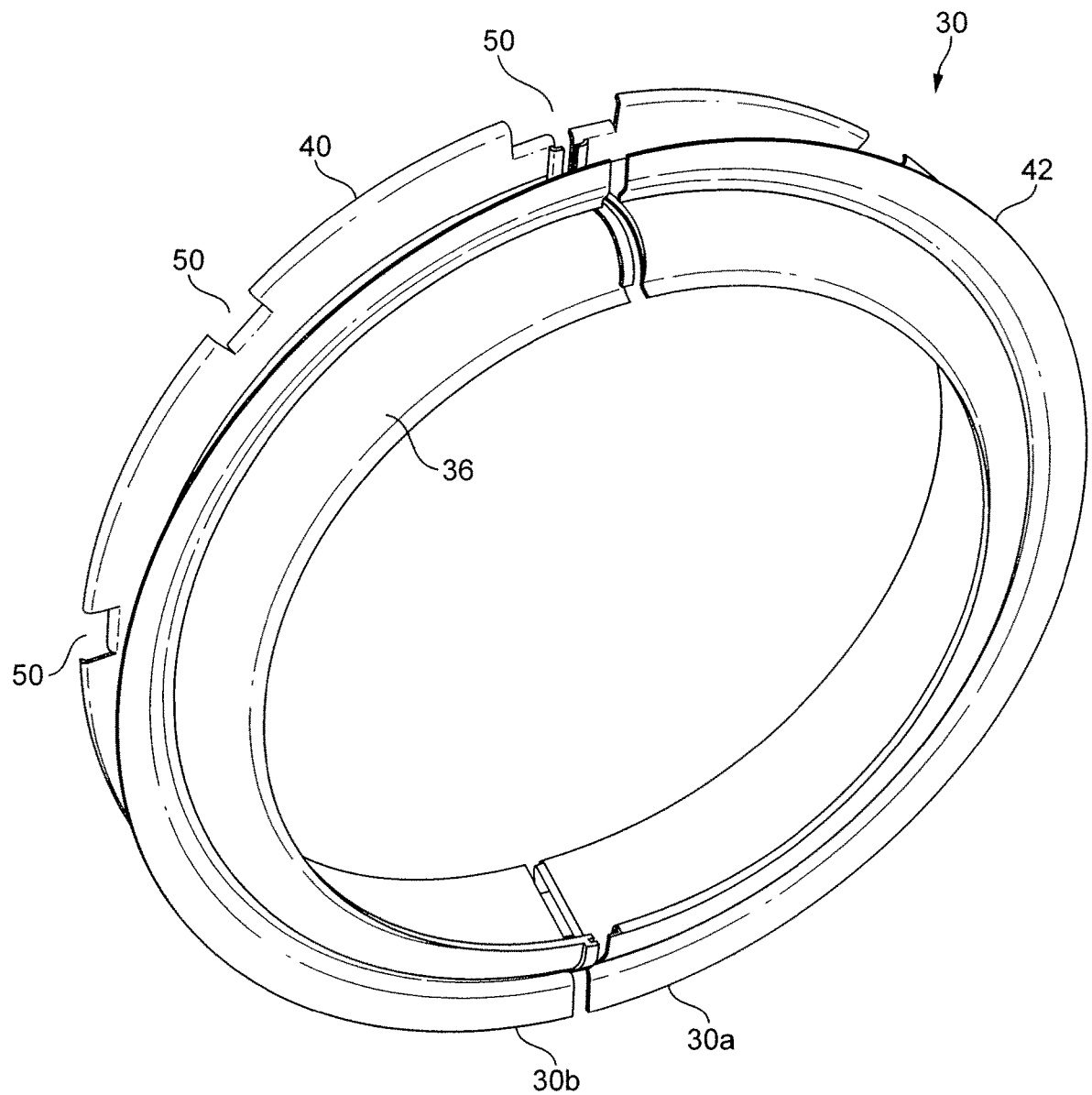
FIG. 5 is a perspective view of a baffle.

FIG. 5 is a perspective view of the baffle, viewed from the drive end. Referring to FIG. 5, it can be seen that the first section 32 includes cut-outs 50. The cut outs 50 correspond to the locations of landing bars in the stator of the electrical machine. The cut-outs 50 allow the baffle to fit around the landing bars, thus ensuring that a seal is provided against the inside surface of the stator frame 20.

Still referring to FIG. 5, it can be seen that the baffle is formed from two parts 30a, 30b. This allows the baffle to be easily manufactured using a moulding process. Furthermore, a two-part baffle design allows the baffle to be fitted around the shaft without the need to remove parts of the machine. Thus the two-part baffle design facilitates assembly of the baffle onto the machine. The two parts 30a, 30b are designed to clip together using male and female connectors on their connecting edges. The baffle may be made from any suitable mouldable material such as heat resistant plastic.

Figure 6:
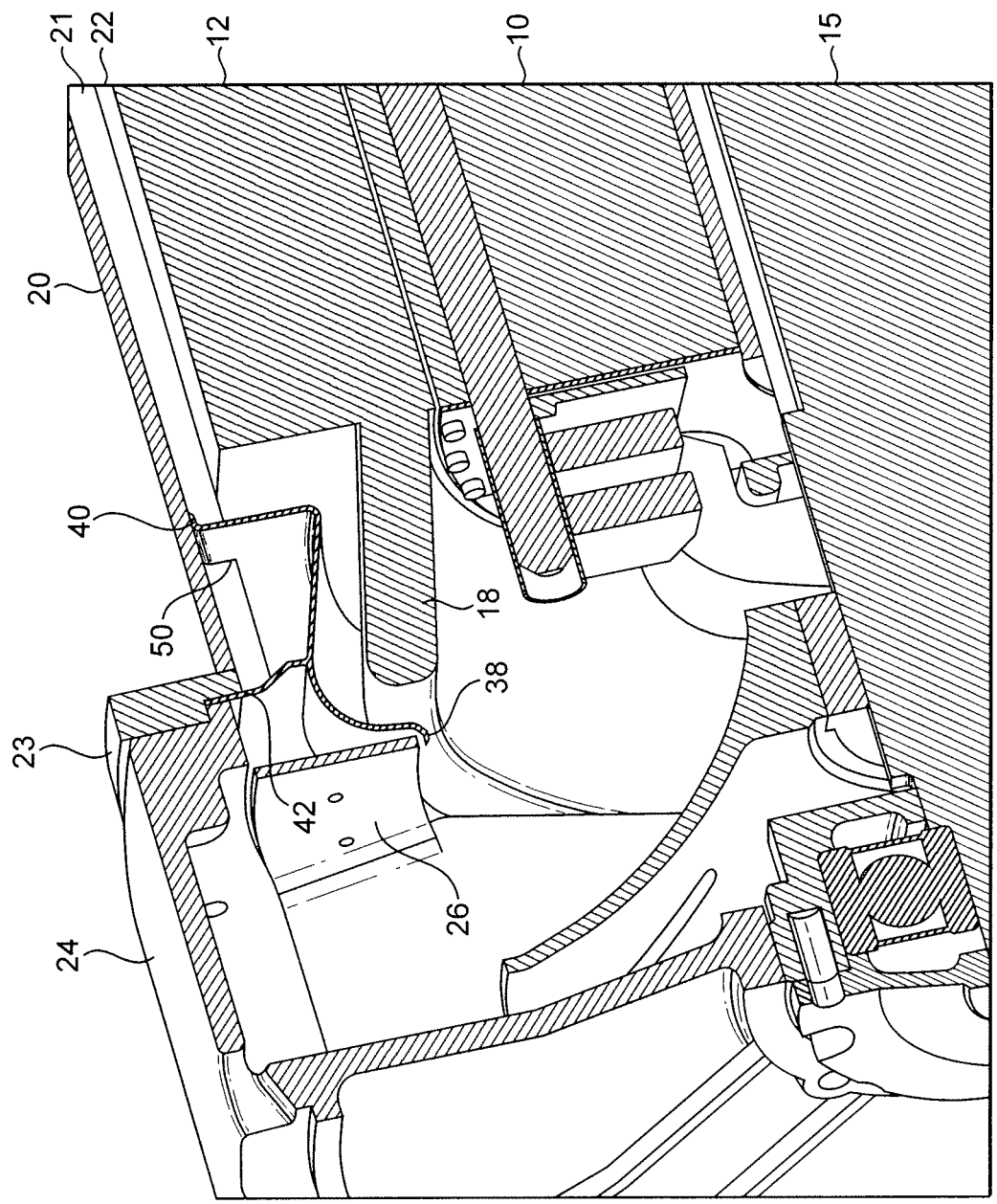
FIG. 6 shows a cut-away perspective view of a machine with a baffle 30 in place.

FIG. 6 shows a cut-away perspective view of the machine with the baffle 30 in place. The baffle 30 is retained axially and radially by clamping the peripheral member 42 between the drive end adaptor 24 and the stator frame 20. This avoids the need to secure the baffle using separate fasteners. The end of the baffle is secured by providing an interference fit between the rim 40 and the inside surface of the stator frame 20. It can be seen that the cut-outs 50 in the baffle engage with landing bars 21 in the stator. By mating the cut-outs 50 with the landing bars 21 in this way, rotation of the baffle is prevented and a better seal with the stator frame is obtained.

In the arrangement described above, the baffle 30 provides a complete seal for air exiting the stator/frame air gap 22, by virtual of the seal between the rim 40 and the frame 20 (or by virtue of the seal between the peripheral member 42 and the frame 20). This forces all of the air exiting the air gap 22 to pass around the end windings 18, which improves their cooling and helps to draw heat out of the machine.

The baffle 30 is also beneficial to the machine's ingress protection (IP) rating as it partially shields the windings from ingress of liquid and debris contaminants.

Practical testing of baffle outlet profiles to the eye of the fan has shown that the way the rotor/stator and stator/frame airflows merge at the nose of the end windings has a significant effect on the airflow split ratios between the two paths. This in turn significantly improves the performance of the baffle and its ability to influence the cooling of the machine as a whole and not just the drive end windings. Testing of the baffle has shown a decrease in the machine's overall airflow but an increase in fan power draw and overall cooling capability.

It will be appreciated that embodiments of the present invention have been described above by way of example, and variations in detail will be apparent to the skilled person. For example, although embodiments of the invention have been described with reference to a synchronous generator, the baffle of the present invention may be used with any type of rotating electrical machine, including any type of motor or generator. The baffle may be provided at either or both ends of the machine.

The invention claimed is:

1. A rotating electrical machine comprising a stator frame and a stator core with a stator/frame air gap between the two, end windings extending out of the stator core, and a baffle for directing cooling air from the stator/frame air gap, the baffle comprising:
    a first, disc-shaped section, the first section having a first surface arranged to direct air flow from the stator/frame air gap along an end face of the stator core;
    a second frustoconical shaped section having a second surface arranged to direct air flow along a radially outwards surface of the end windings; and
    a third, curved annular section, the third section having a third surface extending from an end of the second surface, the third surface curving from an axial direction to a radial direction,
    wherein the second surface extends from a radially inwards edge of the first surface,
    wherein the first surface is arranged to face the stator core, the first surface being adapted to ensure a first airflow path from the stator/frame air gap around the stator core,
    wherein the second surface is arranged to face the radially outwards surface of the end windings with an air gap between the second surface and the end windings, the second surface being adapted to direct the airflow coming from the first airflow path and to ensure a second airflow path along the end windings, and
    wherein the third surface is arranged to direct air flow around an extremity of the end windings.

2. A machine according to claim 1, further comprising a fan arranged to cause air flow through the machine.

3. A machine according to claim 1, wherein the first surface of the baffle is a substantially flat annular surface.

4. A machine according to claim 1, wherein the first surface of the baffle extends in a substantially radial direction.

5. A machine according to claim 1, wherein the baffle is arranged to direct air flow to a cooling fan.

6. A machine according to claim 1, wherein the baffle further comprises a curved lip extending from an end of the third surface.

7. A machine according to claim 1, wherein the baffle further comprises a peripheral member for securing the baffle to the machine.

8. A machine according to claim 1, wherein the baffle comprises at least two axially separated securing means.

9. A machine according to claim 1, wherein the baffle provides a full seal for air flow between the stator/frame air gap and an entry point to a fan.

10. A machine according to claim 1, wherein the baffle is arranged to increase air resistance of air flow through the stator/frame air gap.

11. A machine according to claim 1, wherein an air channel between the baffle and the end windings is substantially constant in depth.

12. A machine according to claim 1, wherein the baffle is arranged to increase an amount of air flow through a rotor/stator air gap.

13. A machine according to claim 1, wherein the baffle is formed from two or more parts which are arranged to clip together.

14. A machine according to claim 1, wherein the second surface of the baffle extends in a substantially axial direction.

15. A machine according to claim 1, wherein the baffle comprises at least one rim to secure the baffle to the machine.

16. A machine according to claim 1, wherein the machine comprises landing bars engageable with the stator core and extending from the stator core toward the stator frame to create the stator/frame air gap.

17. A machine according to claim 16, wherein the first section of the baffle is configured to engage the landing bars to inhibit rotation of the baffle relative to the stator core.

18. A machine according to claim 17, wherein the first section of the baffle includes cutouts which engage the landing bars.

19. A method of cooling a rotating electrical machine, the machine comprising a
stator frame,
a stator core,
a stator/frame air gap between the stator frame and the stator core,
end windings extending out of the stator core, and
a baffle for directing cooling air, the baffle including
a first, disc-shaped section including a first surface arranged to direct air flow from the stator/frame air gap along an end face of the stator core, the first surface arranged to face the stator core, and being adapted to ensure a first airflow path around the stator core,
a second, frustoconical shaped section having a second surface arranged to direct air flow along a radially outwards surface of the end windings, wherein the second surface extends from a radially inwards edge of the first surface, is arranged to face the radially outwards surface of the end windings with an air gap between the second surface and the end windings, and is adapted to direct the airflow coming from the first airflow path and to ensure a second airflow path along the end windings, and
a third, curved annular section, the third section having a third surface extending from an end of the second surface, the third surface curving from an axial direction to a radial direction,
the method comprising:
directing air flow from the stator/frame air gap, via the first surface, along the end face of the stator core,
directing air flow coming from the first airflow path, via the second surface, along the radially outwards surface of the end windings, and
directing air flow coming from the second airflow path, via the third surface, from the axial direction to the radial direction.

20. A rotating electrical machine comprising a stator frame and a stator core with a stator/frame air gap between the two, end windings extending out of the stator core, landing bars engageable with the stator core and extending from the stator core toward the stator frame to create the stator/frame air gap, and a baffle for directing cooling air from the stator/frame air gap,
the baffle comprising:
a first, disc-shaped section, the first section including cutouts configured to engage with the landing bars to inhibit rotation of the baffle relative to the stator core, and a first surface arranged to direct air flow from the stator/frame air gap along an end face of the stator core; and
a second frustoconical shaped section having a second surface arranged to direct air flow along a radially outwards surface of the end windings,
wherein the second surface extends from a radially inwards edge of the first surface,
wherein the first surface is arranged to face the stator core, the first surface being adapted to ensure a first airflow path from the stator/frame air gap around the stator core, and
wherein the second surface is arranged to face the radially outwards surface of the end windings with an air gap between the second surface and the end windings, the second surface being adapted to direct the airflow coming from the first airflow path and to ensure a second airflow path along the end windings.

* * * * *